(12) United States Patent
Robitaille et al.

(10) Patent No.: US 10,764,247 B2
(45) Date of Patent: *Sep. 1, 2020

(54) SYSTEM AND METHODS OF INSTALLING AND OPERATING DEVICES WITHOUT EXPLICIT NETWORK ADDRESSES

(71) Applicant: Accedian Networks Inc., Saint-Laurent (CA)

(72) Inventors: Claude Robitaille, St-Placide (CA); Guillaume Lemieux, St-Eustache (CA)

(73) Assignee: Accedian Networks Inc., Saint-Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/131,530

(22) Filed: Sep. 14, 2018

(65) Prior Publication Data

US 2019/0014079 A1 Jan. 10, 2019

Related U.S. Application Data

(63) Continuation of application No. 15/467,349, filed on Mar. 23, 2017, now Pat. No. 10,097,512, which is a continuation of application No. 15/131,627, filed on Apr. 18, 2016, now Pat. No. 9,641,484, which is a continuation of application No. 14/480,673, filed on Sep. 9, 2014, now Pat. No. 9,344,400, which is a continuation of application No. 13/551,984, filed on Jul. 18, 2012, now Pat. No. 8,862,702.

(51) Int. Cl.
*H04L 29/12* (2006.01)
*H04L 12/24* (2006.01)
*H04L 12/26* (2006.01)

(52) U.S. Cl.
CPC .............. *H04L 61/35* (2013.01); *H04L 41/12* (2013.01); *H04L 41/5009* (2013.01); *H04L 43/08* (2013.01)

(58) Field of Classification Search
USPC .................................. 709/245, 229, 227, 238
See application file for complete search history.

(56) References Cited

U.S. PATENT DOCUMENTS 8,065,418 B1 * 11/2011 Abuan .................. H04L 29/125
709/227
8,160,448 B2 * 4/2012 Tsuge .................. H04L 41/0226
398/115
8,738,013 B2 * 5/2014 Banerjea ................. H04L 45/26
455/445

(Continued)

*Primary Examiner* — Jude Jean Gilles
(74) *Attorney, Agent, or Firm* — Stratford Managers Corporation

(57) ABSTRACT

A method of discovering addressing information of one or more upstream devices to respond to specific messages by a second device on behalf of the one or more upstream devices in a network includes acquiring the addressing information in an upstream direction from one or more downstream devices to the one or more upstream devices. The method further includes acquiring the addressing information in a downstream direction from the one or more upstream devices to the one or more downstream devices. The method further includes responding to specific messages using the acquired addressing information about the one or more upstream devices.

4 Claims, 4 Drawing Sheets

(56) References Cited

U.S. PATENT DOCUMENTS

| | | | | |
|---|---|---|---|---|
| 8,861,371 B2* | 10/2014 | Krzanowski | ........ | H04L 41/0213 |
| | | | | 370/225 |
| 9,112,781 B2* | 8/2015 | Davison | .............. | H04L 12/4633 |
| 9,558,291 B2* | 1/2017 | Ito | ......................... | G06F 16/957 |
| 10,187,441 B2* | 1/2019 | Martell | ................. | H04L 65/605 |
| 2003/0115488 A1* | 6/2003 | Kunito | .................... | H04L 63/08 |
| | | | | 726/4 |
| 2005/0105543 A1* | 5/2005 | Ikenaga | ............ | H04L 29/12367 |
| | | | | 370/428 |
| 2005/0177646 A1* | 8/2005 | Kawano | ............ | H04L 29/12009 |
| | | | | 709/245 |
| 2007/0280228 A1* | 12/2007 | Tanimoto | ............ | H04L 41/0226 |
| | | | | 370/389 |
| 2008/0256251 A1* | 10/2008 | Huotari | ................... | H04L 67/16 |
| | | | | 709/229 |
| 2009/0168783 A1* | 7/2009 | Mohan | ................ | H04L 12/4633 |
| | | | | 370/395.5 |
| 2009/0219949 A1* | 9/2009 | Iwazaki | ................... | H04L 47/10 |
| | | | | 370/463 |
| 2011/0222413 A1* | 9/2011 | Shukla | ................ | H04L 43/0811 |
| | | | | 370/241.1 |
| 2012/0057602 A1* | 3/2012 | Tanimoto | ............ | H04L 41/0893 |
| | | | | 370/401 |
| 2012/0087255 A1* | 4/2012 | Ukita | ................. | H04L 12/4625 |
| | | | | 370/252 |
| 2012/0239821 A1* | 9/2012 | Hozumi | .............. | H04L 67/1008 |
| | | | | 709/238 |
| 2013/0259056 A1* | 10/2013 | Kotrabasappa | ......... | H04L 45/50 |
| | | | | 370/401 |

* cited by examiner

SYSTEM AND METHODS OF INSTALLING AND OPERATING DEVICES WITHOUT EXPLICIT NETWORK ADDRESSES

CROSS-REFERENCE TO RELATED APPLICATIONS

This application is a continuation of U.S. patent application Ser. No. 15/467,349, filed Mar. 23, 2017, now allowed, which is a continuation of U.S. patent application Ser. No. 15/131,627, filed Apr. 18, 2016, now U.S. Pat. No. 9,641,484, which is a continuation of U.S. patent application Ser. No. 14/480,673, filed Sep. 9, 2014, now U.S. Pat. No. 9,344,400, which is a continuation of and claims priority to U.S. patent application Ser. No. 13/551,984, filed Jul. 18, 2012, now U.S. Pat. No. 8,862,702, each of which is hereby incorporated by reference herein in its entirety.

This application incorporates by reference in their entireties the following applications, all of which have the same filing date as the present application: U.S. application Ser. No. 13/551,804, "Programmable Small Form-Factor Pluggable Module," by Robitaille and Ostiguy; U.S. application Ser. No. 13/551,998 "Systems and Methods of Detecting and Assigning IP Addresses to Devices with ARP Requests," by Robitaille and Lemieux; U.S. application Ser. No. 13/552,022, "Systems and Methods of Using Beacon Messages to Discover Devices Across Subnets," by Robitaille and Bouffard and U.S. application Ser. No. 13/552,063, "Systems and Methods of Discovering and Controlling Devices without Explicit Addressing," by Robitaille and Bouffard.

TECHNICAL FIELD

This invention is directed towards addressing the need for installing and operating, without prior configuration or knowledge and without network addresses, devices in a network for handling service requests on behalf of other upstream or downstream devices.

BACKGROUND

Some devices in a network may not be able to perform Service Operations Administration and Maintenance (SOAM) and other functions on their own. Network operators are looking to deploy SOAM devices at different points inside their network infrastructure.

BRIEF SUMMARY

There is a need to install devices that can perform such SOAM and other functions on behalf of other upstream or downstream devices. These SOAM capable devices may or may not be permanently installed inside a network. By allowing their installation and operation without the need for an explicit network address, it is possible to reduce or eliminate the need for an explicit configuration resulting in easier and more efficient deployment and use of these devices. Since such devices are not assigned a network address, there is a need to be able to discover the devices in a network where it may not actively participate in the normal network protocols that are in use. With some networks, the IDs or labels used by the protocols are not necessarily the same in both directions. If the devices are not participating in the underlying protocols (ex. MPLS, L2TPv3, GTP-U, etc.), the devices may not readily know what ID or label to use to communicate.

The devices must also be able to be discovered without (but not excluding) being pre-programmed with information specific to the network or the control infrastructure.

One aspect of the present invention relates to a method of discovering addressing information of one or more upstream devices to respond to specific messages by a second device on behalf of the one or more upstream devices in a network. The method includes acquiring the addressing information in an upstream direction from one or more downstream devices to the one or more upstream devices. The method further includes acquiring the addressing information in a downstream direction from the one or more upstream devices to the one or more downstream devices. The method further includes responding to specific messages using the acquired addressing information about the one or more upstream devices.

Additional aspect of the present invention relates to a method of discovering addressing information of one or more upstream devices to respond to specific messages by a second device on behalf of the one or more upstream devices in a network. The method includes pre-programming the second device with test packets that include addressing information in an upstream direction for the one or more upstream devices in each test packet. The method additionally includes using upstream test packets for triggering one of the one or more upstream devices to respond with a packet including the addressing information in a downstream direction to one of one or more downstream devices from one of the one or more upstream devices. The method further includes responding to specific messages including requests for functions that the one or more upstream devices are unable to perform using the acquired addressing information about one of the one or more upstream devices.

An additional aspect of the present invention relates to a system of discovering addressing information of one or more upstream devices to respond to specific messages by a second device on behalf of the one or more upstream devices in a network. The system includes at least one downstream device coupled to a first processor; at least one upstream device coupled to a second processor; and a second device coupled to a third processor, the second device located between the at least one downstream device and the at least one upstream device. The second device is configured to acquire addressing information in an upstream direction from the at least one downstream device and in a downstream direction from the at least one upstream device in order for the second device to respond on behalf of the at least one upstream device to the specific messages including requests for functions that the one or more upstream devices are unable to perform.

BRIEF DESCRIPTION OF THE DRAWINGS

The foregoing and other advantages of the present disclosure will become apparent upon reading the following detailed description and upon reference to the drawings.

Figure 1:
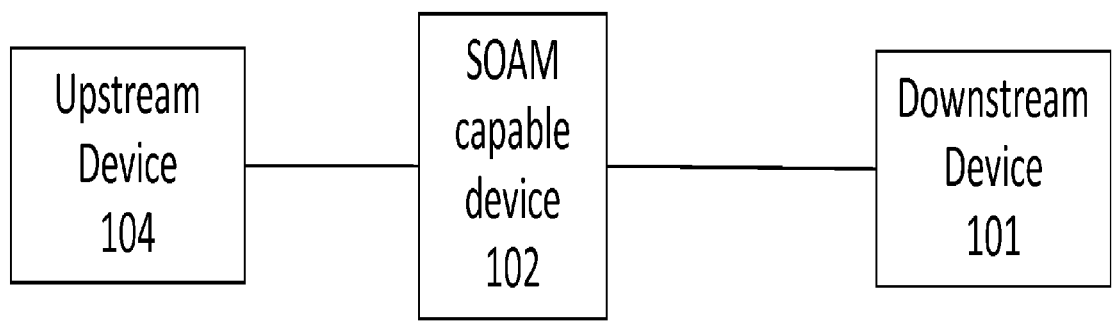
FIG. 1 illustrates a Multiprotocol Label Switching Network (MPLS) network with an upstream device unable to perform SOAM functions, a device capable of performing SOAM functions on behalf of the upstream device and a downstream device capable of requesting SOAM functions.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

In order for a SOAM capable device to be inserted into a network and perform SOAM and other functions of behalf of an upstream device or a plurality of upstream devices unable to perform such SOAM functions, the device must be able to learn or acquire information about the addressing of the other devices for which it needs to perform the SOAM functions. This learning or acquiring shall be transparent to other devices in the network and must not interfere with normal operation of the network.

FIG. 1 illustrates a generic portion of a MPLS network. Downstream device 101 is a network device capable of requesting SOAM functions from other devices inside the network. The downstream device 101 may be a testing unit, a router or a remote node that is local or external to a subnet where a device 102 that is configured to perform SOAM functions is located. Device 104 is an upstream device inside the same network that is unable to perform SOAM functions. The upstream device 104 may be a router or a remote node that is local or external to a subnet where the device 102 is located. The device 102 is therefore inserted in front of the upstream device 104 in order to perform the SOAM functions on behalf of the upstream device 104. The device 102 incorporates a field programmable gate array (FPGA). According to another embodiment of the present invention, the device 102 incorporates an application specific integrated circuit (ASIC). The SOAM functions include monitoring traffic and diagnosing issues, performing remote in-service layer 1-4 loopback, ITU-T Y.1564, ITU-T Y.1731 and RFC 2544 performance testing and monitoring actual customer or user and network statistics via a management interface, and other functions.

Figure 2:
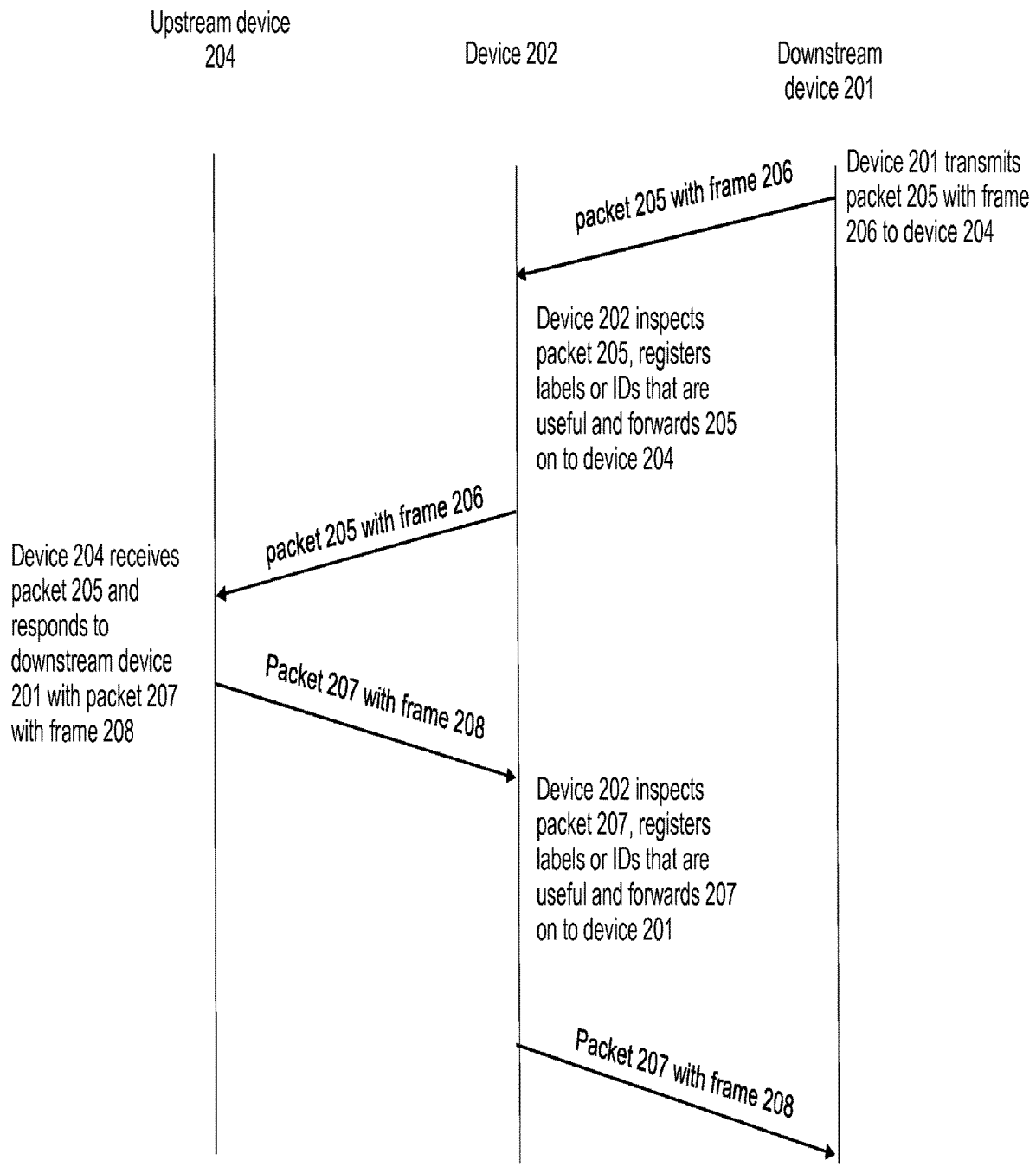
FIG. 2 shows the flow of messages through a device that is capable of passively discovering labels or IDs for a network when it is not configured with any prior knowledge of other devices or of the network and is not assigned any unique addressing information inside that network.

In one embodiment, in order to learn, discover or acquire the required addressing information about the upstream device, the SOAM device may take a passive role. Referring now to FIG. 2, this can be achieved by inspecting particular messages sent to an upstream device 204 behind the device 202 using a tunneling protocol such as MPLS. The upstream device 204 could be for example a handset or an LTE EnodeB and needs to be in the tunnel of interest and capable to respond. Sometimes it is difficult to respond because of firewalls or lack of service for the message. One solution to this problem is to make sure that the device 202 is pre-programmed to passively look at any packets to and from the upstream device 204. Responses from the upstream device 204 are identified by using the IP address in the tunnel or in the label stack of packets originating from the upstream device 204. Other identifiers could also be used. The device 202 looks at the messages from the upstream device 204 and registers one or more labels or IDs that are useful.

In FIG. 2, the downstream device 201 sends a packet 205 with a frame 206 to the upstream device 204 which will require a response. The device 202 is in the tunnel of interest and inspects the packet 205, registering labels or IDs that are useful and then forwards the packet 205 with the frame 206 on to the upstream device 204. These labels and IDs may or may not have specific fields that are intended to aid in discovery of the addressing information of the upstream device 204. The upstream device 204 receives packet 205 with frame 206 and responds to the downstream device 201 with a packet 207 that contains a frame 208. The device 202 receives the packet 207 with the frame 208. The device 202 inspects the packet 207, registering labels and IDs that are useful and forwards the packet 207 on to the downstream device 201. The device 202 now has the required addressing information about the upstream device 204 to perform SOAM functions on behalf of the upstream device 204.

Figure 3:
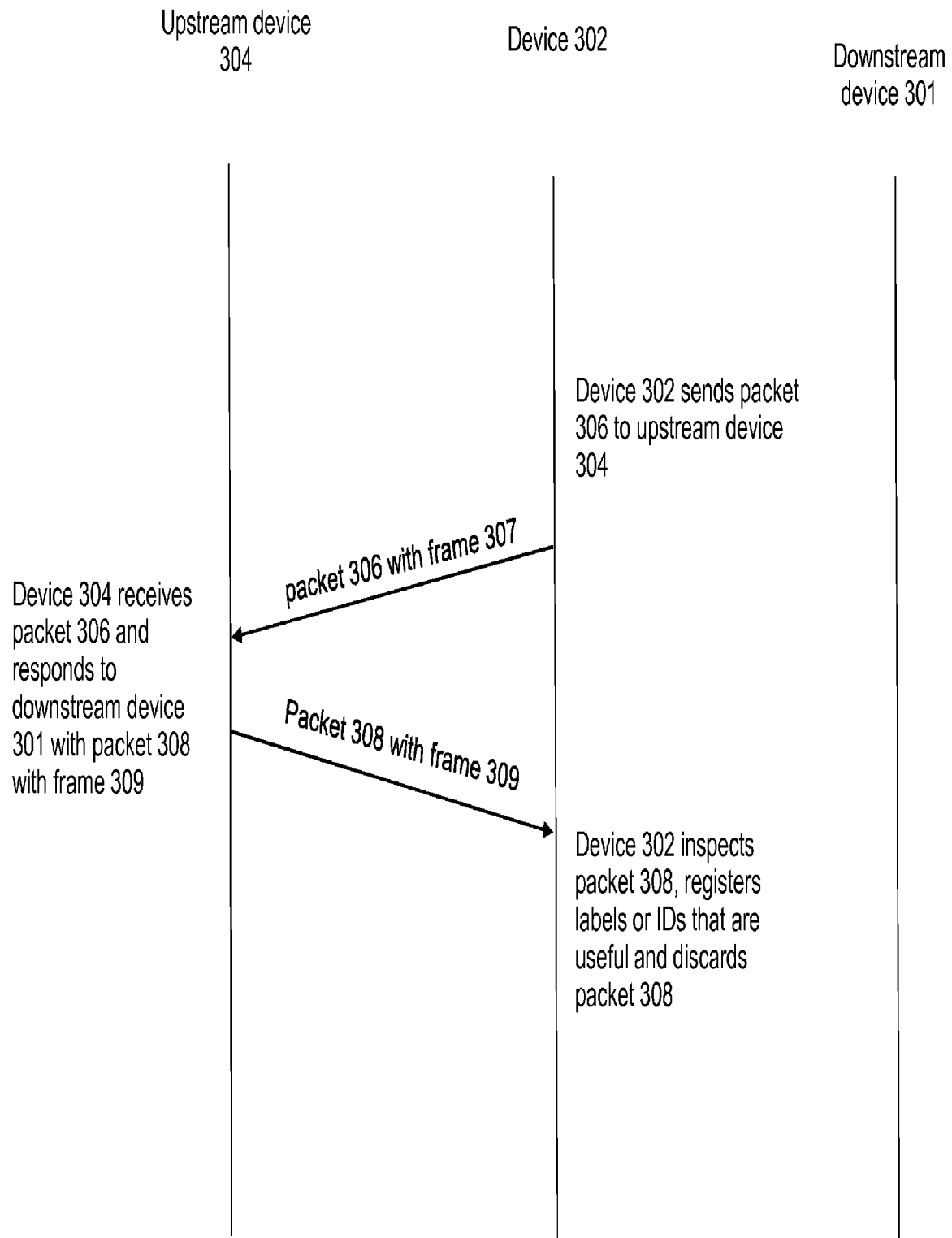
FIG. 3 shows the flow of messages through a device that is capable of actively triggering the discovery of labels or IDs for a network when it is configured with some prior knowledge about other devices and is not assigned any unique addressing information inside that network.

In another embodiment, in order to learn, discover or acquire the required addressing information about the upstream device, the SOAM device may take an active role. Referring now to FIG. 3, device 302 is pre-programmed with a first test message 306 aimed at triggering a response from an upstream device 304. According to one aspect of the present invention, the pre-programming includes providing, via configuration or other means, addressing information about the labels or IDs needed to address each of the upstream devices 304. The device 302 transmits a packet 306 with a frame 307 to the upstream device 304. The upstream device 304 receives the packet 306 with the frame 307. The upstream device 304 either has special software for the explicit purpose to handle the special packet 306 or the packet 306 is addressed to a service known as already active on upstream device 304. The upstream device 304 then responds to the device 302 with a packet 308 with a frame 309. The device 302 analyzes the packet 308 and registers one or more labels or IDs, and then discards the packet 308 (without forwarding it) to avoid disrupting the operation of the network. The device 302 now has the required addressing information about the upstream device 304 to perform SOAM functions on behalf of the upstream device 304.

Figure 4:
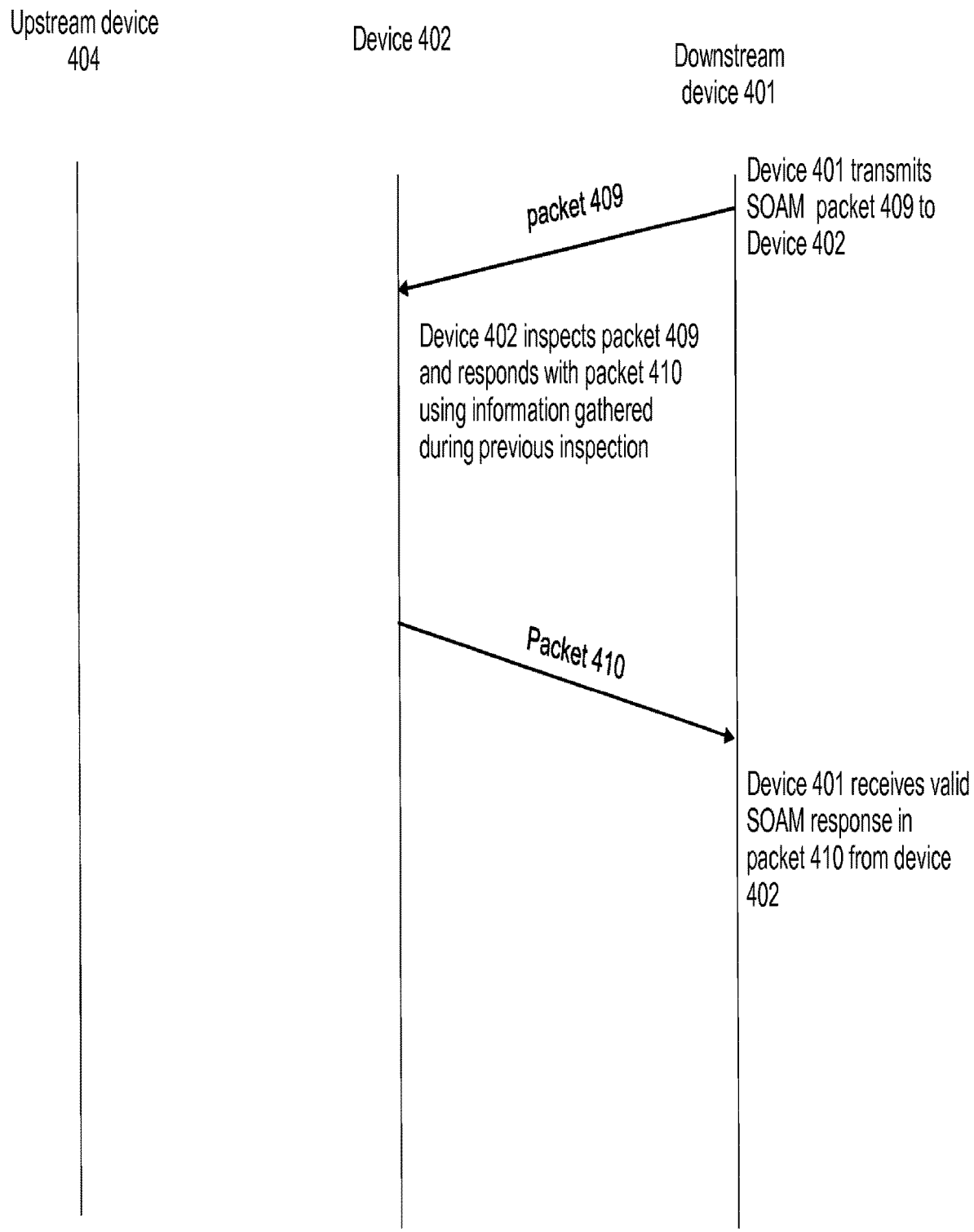
FIG. 4 shows the flow of messages where a device handles SOAM functions using acquired information on behalf of an upstream device that is not capable of performing the requested SOAM functions.

Once the SOAM device has obtained the required addressing information about the upstream device as per the method illustrated by FIG. 2 or 3, it may begin to provide SOAM and other functions on behalf of the upstream device while letting other traffic flow transparently to and from the upstream device. Referring now to FIG. 4, a protocol flow diagram illustrates how downstream device 401 can request a SOAM function from upstream device 404 and how it is transparently handled by device 402.

The downstream device 401 transmits a SOAM packet 409 to device 402. The device 402 receives the packet 409. The device 402 determines whether the packet 409 is for a SOAM function that the device 402 needs to handle on behalf of an upstream device 404. If the packet 409 is for a SOAM function, the device 402 performs the requested SOAM function using the addressing information collected for the upstream device 404 and prepares a valid response packet 410. The response packet 410 is then received by the downstream device 401 and is handled as the response to the SOAM request in packet 409.

In another embodiment, it should be noted that the SOAM capable device may handle the SOAM function on behalf of a plurality of devices located upstream or downstream from the SOAM capable device. When providing SOAM functions on behalf of a plurality of other devices, the SOAM capable device will learn and store the labels or IDs for each flow direction for each of the learned devices.

The device to discover and the discoverer node are each coupled to a processor. The present invention includes systems having processors to provide various functionality to process information, and to determine results based on inputs. Generally, the processing may be achieved with a combination of hardware and software elements. The hardware aspects may include combinations of operatively coupled hardware components including microprocessors, logical circuitry, communication/networking ports, digital filters, memory, or logical circuitry. The processors may be adapted to perform operations specified by a computer-executable code, which may be stored on a computer readable medium.

The steps of the methods described herein may be achieved via an appropriate programmable processing device, such as an external conventional computer or an on-board field programmable gate array (FPGA) or digital signal processor (DSP), that executes software, or stored instructions. In general, physical processors and/or machines employed by embodiments of the present invention for any processing or evaluation may include one or more networked or non-networked general purpose computer systems, microprocessors, field programmable gate arrays (FPGA's), digital signal processors (DSP's), microcontrollers, and the like, programmed according to the teachings of the exemplary embodiments of the present invention, as is appreciated by those skilled in the computer and software arts. Appropriate software can be readily prepared by programmers of ordinary skill based on the teachings of the exemplary embodiments, as is appreciated by those skilled in the software arts. In addition, the devices and subsystems of the exemplary embodiments can be implemented by the preparation of application-specific integrated circuits or by interconnecting an appropriate network of conventional component circuits, as is appreciated by those skilled in the electrical arts. Thus, the exemplary embodiments are not limited to any specific combination of hardware circuitry and/or software.

Stored on any one or on a combination of computer readable media, the exemplary embodiments of the present invention may include software for controlling the devices and subsystems of the exemplary embodiments, for driving the devices and subsystems of the exemplary embodiments, for processing data and signals, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementations. Computer code devices of the exemplary embodiments of the present invention can include any suitable interpretable or executable code mechanism, including but not limited to scripts, interpretable programs, dynamic link libraries (DLLs), Java classes and applets, complete executable programs, and the like. Moreover, parts of the processing of the exemplary embodiments of the present invention can be distributed for better performance, reliability, cost, and the like.

Common forms of computer-readable media may include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A method of discovering addressing information of one or more first devices by a second device located upstream of a third device, the method comprising:
    inspecting, at said second device, packets sent from said third device to said one or more first devices;
    acquiring, by the second device, addressing information from said packets related to said one or more first devices; and
    responding, by the second device on behalf of the one or more first devices, to Operations, Administration, Management (OAM) messages.

2. The method of claim 1 further comprising:
    inspecting, at said second device, second packets sent from said one or more first device to said third device;
    acquiring, by the second device, further addressing information from said second packets.

3. A system of discovering addressing information of one or more first devices by a second device, the system comprising:
    said one or more first devices coupled to a first processor and said second device located upstream of said first devices coupled to a second processor;
    at least one third device coupled to a third processor and located upstream from said first and second devices;
    wherein the second device is configured to inspect packets sent by said third device to said one or more first devices to acquire addressing information of said one or more first devices in order to respond to Operations, Administration, Management (OAM) messages on behalf of said first devices.

4. The system of claim 3 further comprising:
    wherein the second device is configured to inspect second packets sent by said one or more first devices to said third devices to acquire further addressing information in order to respond to Operations, Administration, Management (OAM) messages on behalf of said first devices.

* * * * *